(12) United States Patent
Webb et al.

(10) Patent No.: US 6,801,722 B1
(45) Date of Patent: Oct. 5, 2004

(54) OPTICAL TRACKING SYSTEM WITH REFLECTIVE FIBER

(75) Inventors: James S. Webb, Redmond, WA (US); John A. Bell, Issaquah, WA (US); Herman M. Presby, Highland Park, NJ (US)

(73) Assignee: Terabeam Corporation, Redmond, WA (US)

( * ) Notice: Subject to any disclaimer, the term of this patent is extended or adjusted under 35 U.S.C. 154(b) by 564 days.

(21) Appl. No.: 09/847,608

(22) Filed: May 1, 2001

(51) Int. Cl.[7] ............................................. H04B 10/00
(52) U.S. Cl. ........................ 398/156; 398/141; 359/1
(58) Field of Search .............................. 398/9, 21, 118, 398/130, 131, 156, 140, 212, 201, 88, 141, 169–170; 359/1, 27, 584, 629; 306/3–4.8, 340, 460, 462, 477, 139.07–139.08; 385/90, 93

(56) References Cited

U.S. PATENT DOCUMENTS

| | | | |
|---|---|---|---|
| 5,237,630 A | * | 8/1993 | Hogg et al. .................... 385/12 |
| 5,627,669 A | * | 5/1997 | Orino et al. ................. 398/129 |
| 5,668,899 A | | 9/1997 | Jadrich |
| 5,720,653 A | | 2/1998 | Miller et al. |
| 6,027,255 A | * | 2/2000 | Joo et al. ....................... 385/88 |
| 6,049,377 A | * | 4/2000 | Lau et al. ...................... 356/73 |
| 6,268,944 B1 | * | 7/2001 | Szapiel ........................ 398/129 |
| 6,445,854 B1 | * | 9/2002 | Miller .......................... 385/38 |
| 6,490,070 B1 | * | 12/2002 | Adams et al. ............... 398/131 |
| 6,529,657 B2 | * | 3/2003 | Goldberg et al. ............. 385/31 |
| 6,654,517 B2 | * | 11/2003 | Fairchild et al. .............. 385/33 |

* cited by examiner

*Primary Examiner*—Kinfe-Michael Negash
(74) *Attorney, Agent, or Firm*—Blakely Sokoloff Taylor & Zafman, LLP

(57) ABSTRACT

An optical tracking system for use in an optical receiver of an optical communication system includes a first focus unit, a tracker, and an optical fiber having an angled tip. The first focus unit receives an optical signal to be tracked and focuses it on the angled tip of the fiber. The fiber is connected to a communications detector of the optical communication system. In addition, the angled tip of the fiber reflects a portion of the focused optical signal to the tracker. The tracker processes the reflected portion of the optical signal to correct for any misalignment between the optical signal and the optical receiver.

28 Claims, 3 Drawing Sheets

OPTICAL TRACKING SYSTEM WITH REFLECTIVE FIBER

TECHNICAL FIELD

This disclosure relates generally to optical tracking systems, and in particular but not exclusively, to optical tracking systems for use in optical communication systems.

BACKGROUND

With the increasing popularity of wide area networks, such as the Internet and/or World Wide Web, network growth and traffic have exploded in recent years. Network users continue to demand faster networks, and as network demands continue to increase, existing network infrastructures and technologies are reaching their limits.

An alternative to existing hardwire or fiber network solutions is the use of wireless optical telecommunications technology. Wireless optical telecommunications utilize beams of light, such as lasers, as optical communications signals, and therefore do not require the routing of cables or fibers between locations. Data or information is encoded into a beam of light, and then transmitted through free space from a transmitter to a receiver. The receiver includes a communications detector (including a demodulator or decoder) to extract the data or information from the optical signals.

For point-to-point free space laser communications, the use of narrow optical beams provides several advantages, including data security, high customer density, and high directivity. High directivity makes the achievement of high data rates and high link availability easier, due to higher signal levels at a receiver. In order to take full advantage of this directivity, some form of tracking is often necessary to keep the antennas of a transmitter and of the receiver properly pointed at each other. For example, a transmitted optical beam with a one milli-radian divergence has a spot diameter at the receiver of about one meter at a one kilometer range. Thus, movement of the transmitter or receiver by even a small fraction of the divergence (or field-of-view) could compromise the link unless active tracking is employed.

SUMMARY

In accordance with aspects of the present invention, an optical tracking system for use in an optical receiver of an optical communication system is provided. In one aspect, the optical tracking system includes a first focus unit, a tracker, and an optical fiber having an angled tip. The first focus unit receives an optical signal and focuses the optical signal on the tip of the fiber. The fiber is connected to a communications detector of the optical communication system. In addition, the angled tip of the fiber reflects a portion of the focused optical signal to the tracker. The tracker processes the reflected portion of the optical signal to correct for any misalignment between the optical signal and the optical receiver. This aspect of the invention advantageously eliminates the need for a beam splitter, which are typically required in known optical tracking systems.

In another aspect of the present invention, the optical tracking system further includes a second focus unit to receive the reflected portion of the optical signal and focus it for use by the tracker. In one embodiment, the second focus unit can include a focusing lens and a wedge. The wedge is used to steer the reflected portion of the optical signal to the focusing lens, which then focuses the reflected portion of the beam on an optical detector of the tracker. This embodiment is advantageously used in systems in which the fiber can be moved in an axial direction. In one embodiment, the optical detector includes a quad cell detector circuit.

In another aspect of the present invention, a coating is added to the surface of the tip of the angle-tipped fiber. The coating is partially reflective with respect to the optical signal, allowing a majority of the optical signal to pass through to be propagated by the fiber. This aspect can be advantageous in that when there is misalignment between the optical signal and the optical receiver, the optical signal would tend to illuminate the cladding region of the fiber rather than the core. The reflective coating then increases the power of the portion of the optical signal received by the tracker.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

FIG. 2A is a cross-sectional diagram illustrating an angle-polished fiber for use in the tracking system of FIG. 1, according to another embodiment of the present invention.

FIG. 2B is a cross-sectional diagram illustrating an angle-polished fiber for use in the tracking system of FIG. 1, according to yet another embodiment of the present invention.

DETAILED DESCRIPTION OF THE ILLUSTRATED EMBODIMENTS

Embodiments of a system and method for optical tracking using a reflective fiber are described herein. In the following description, numerous specific details are provided (for example, focus units, optical detectors and fibers), to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In one embodiment, an optical tracking system according to the present invention is part of an optical communication system having an optical transmitter and an optical receiver. In a typical operation of the optical communication system, the optical transmitter provides an optical signal containing communication information. The optical receiver receives the optical signal. The optical receiver includes a communications detector to extract the communication information from the received optical signal. The optical tracking system maintains alignment between the optical receiver and the optical signal to help optimize performance of the optical communication system. Embodiments of an optical tracking system according to the present invention are described below.

Figure 1:
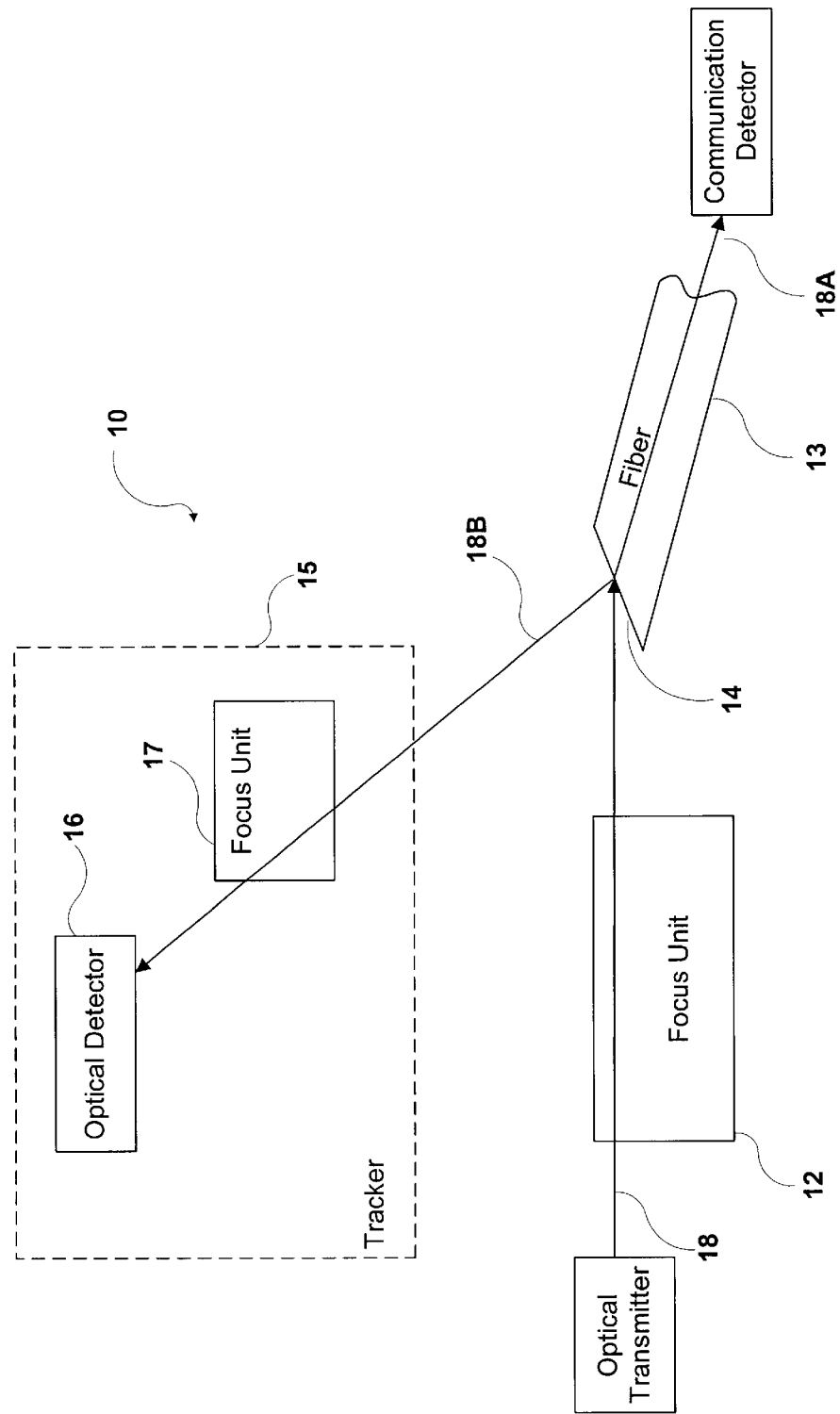
FIG. 1 is a block diagram illustrating a tracking system for use in an optical communication system, according to one embodiment of the present invention.

FIG. 1 illustrates an optical tracking system 10 (not to scale) for use in an optical communication system, according to one embodiment of the present invention. In this embodiment, optical tracking system 10 is part of an optical receiver (not shown). In one embodiment, optical tracking system 10 includes a focus unit 12, a fiber 13 with an angled tip 14, and a tracker 15. In one embodiment, tracker 15 includes an optical detector 16 and a focus unit 17. An optical transmitter (not shown) provides an optical signal, represented by an arrow 18 (and referred to hereinafter as optical signal 18), to the optical receiver containing optical tracking system 10.

Focus unit 12 can include optics to focus optical signal 18 on a desired target. In one embodiment, optical signal 18 can be implemented using a beam of laser light. The laser light can have a wavelength ranging between 500 nm and 2000 nm, as is commonly used in optical communication systems. Other embodiments may use radiation of different wavelengths that are suitable for the intended application.

In one embodiment, the optics of focus unit 12 is implemented using a lens or lenses. In other embodiments, focus unit 12 can be implemented, for example, using reflective optical imaging with spherical, ellipsoidal or other reflective surfaces. In yet another embodiment, focus unit 12 can include transmissive or reflective holographic optical elements such as, for example, the holographic optical element disclosed in co-pending and commonly assigned U.S. patent application Ser. No. 09/627,816 entitled "Apparatus and Method for Correcting Aberrations in Photon Collection Devices," filed Jul. 28, 2000.

Fiber 13 can be a standard optical fiber with a cladding surrounding either a multi-mode or a single-mode core. Fiber 13 and focus unit 12 are arranged so that the axis of the received beam is parallel to the axis of the beam that optimally couples to fiber 13. This coupling is determined in part by the refraction of light at the air-glass interface at angled tip 14. A typical index of refraction of the glass fiber core is roughly 1.5 compared to the index of refraction of air, which is close to one. By application of Snell's law of refraction, an angle-polished fiber that is tilted about eight degrees, for example, from perpendicular to the fiber's longitudinal axis, the deviation of the optimal coupling beam from the fiber axis is roughly four degrees. In other embodiments, other polish angles and/or cores with difference indices of refraction can be used, which would result in different deviations of the optimal coupling beam.

Angled tip 14 of fiber 13 has an angle that reflects a portion of optical signal 18 toward tracker 15 when optical signal 18 is misaligned within a selected tolerance. One embodiment of angled-tip 14 is described in more detail below in conjunction with FIG. 2.

Tracker 15, in this embodiment, is a unit that detects and corrects for misalignment between optical signal 18 and the optical receiver using any suitable tracking technique. For example, tracker 15 can implement the tracking technique disclosed in co-pending and commonly assigned U.S. patent application Ser. No. 09/627,277, entitled "Method and Apparatus For Tracking in an Optical Communication System", or U.S. patent application Ser. No. 09/627,819, entitled "Method And Apparatus For Tone Tracking In Wireless Optical Communication Systems", both filed Jul. 28, 2000. In this embodiment, tracker 15 uses optical detector 16 and focus unit 17.

Optical detector 16, in this embodiment, detects misalignment between optical signal 18 and the optical receiver, using the known relative positions and orientations of the other elements of optical tracking system 10.

Focus unit 17 can include optics, such as lenses, to focus a reflection from fiber 13 onto optical detector 16. Similar to focus unit 12 (described above) in other embodiments, focus unit 17 can be implemented using optics other than lenses. For example, in an alternative embodiment, focus unit 17 can include reflective optical imaging with spherical, ellipsoidal or other reflective surfaces. In yet another embodiment, focus unit 17 can include transmissive or reflective holographic optical elements.

This embodiment of optical tracking system 10 can operate as follows. Focus unit 12 receives optical signal 18. Focus unit 12 contains optics that focus optical signal 18 onto angled tip 14 of fiber 13. In particular, focus unit 12 is arranged to focus optical signal 18 onto the core of fiber 13 (e.g., see FIG. 2) with a preselected spot size. When optical signal 18 and the optical receiver are properly aligned, focus unit 12, ideally, centers the beam spot on the longitudinal axis of fiber 13. Fiber 13 then propagates a relatively large portion of optical signal 18, represented by an arrow 18A (referred to hereinafter as non-reflected optical signal 18A) shown in fiber 13. Fiber 13 propagates non-reflected optical signal 18A to a communications detector (not shown) that extracts communication information from the optical signal.

However, a relatively small portion of optical signal 18 is reflected from angled tip 14, as represented by an arrow 18B in FIG. 1 (also referred to herein as reflected optical signal 18B). For example, in one embodiment, about 4% to 5% of the power of optical signal 18 is reflected by fiber 13 to form reflected optical signal 18B. The power of reflected optical signal 18B can be adjusted by coating angled tip 14 (described below in conjunction with FIG. 2). Focus unit 17 then focuses reflected optical signal 18B onto optical detector 16, which then uses information provided by reflected optical signal 18B to detect any misalignment between optical signal 18 and the optical receiver containing optical tracking system 10. Tracker 15 uses information provided by optical detector 16 to adjust the alignment between optical signal 18 and the optical receiver using a suitable tracking technique.

In contrast, known systems typically include a beam splitter to receive the optical signal from a focus unit (such as focus unit 12). The beam splitter would allow most of the optical signal to pass through to the communications detector, with the beam splitter directing a portion (e.g., 10%) toward a tracking unit. Thus, the communications unit receives an optical signal that is already reduced by the amount that is split to the tracking unit. Moreover, because the communications detector commonly includes an optic fiber to receive the main portion of the optical signal from the beam splitter, reflection loss from the fiber can result in still more loss. Reflection loss will generally result from the difference in refractive index between the air and the glass of fiber 13. The loss from the beam splitter combined with the reflective loss from the air-fiber interface can degrade the performance of the communications detector.

Compared to the above-described known system, this embodiment of optical tracking system 10 has several advantages. For example, optical tracking system 10 omits the beam splitter and, instead, uses a portion of optical signal 18 that would likely be reflected by the air-fiber interface in any case. Thus, optical tracking system 10 can allow more of the power of optical signal 18 to be used by the communications detector (not shown) to extract the communication information, which can improve the performance of the optical receiver. In addition, beam splitters tend to be costly compared to forming an angled-tip on a fiber. Consequently, optical tracking system 10 can be less costly than systems that use a beam splitter. Still further, the beam splitter occupies space in the optical receiver, which can undesirably increase the total size of the optical receiver. Yet another advantage is that if the position of the fiber 13 is disturbed (e.g., experiences vibration), optical tracking system 10 can detect the disturbance and adjust alignment in response. That is, the changed position of fiber 13 changes the direction of reflected optical signal 18B that is received by optical detector 16, which then causes an appropriate adjustment in the alignment. In contrast, in a beam splitter system, changes in the position of the fiber (which is "downstream" from the beam splitter) does not result a change in the reflected optical signal 18B.

Figure 2:
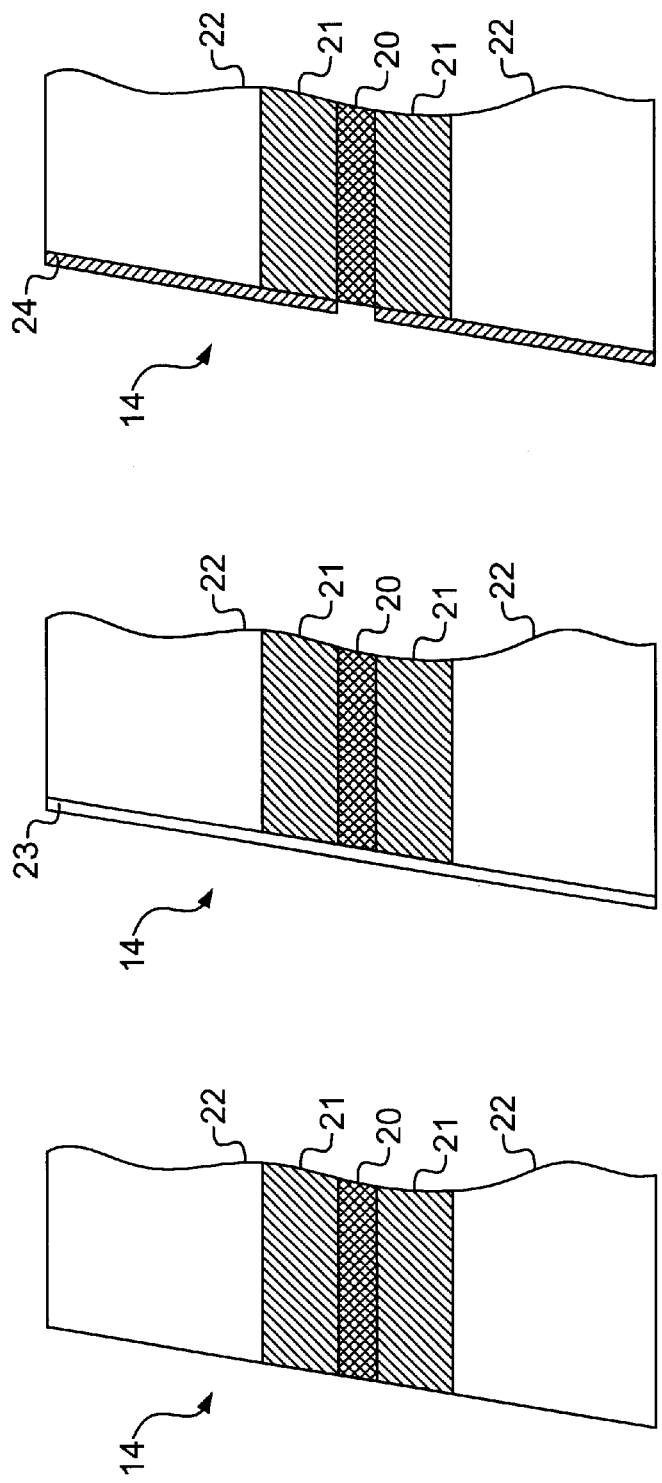
FIG. 2 is a cross-sectional diagram illustrating an angle-polished fiber for use in the tracking system of FIG. 1, according to one embodiment of the present invention.

FIG. 2 illustrates fiber 13 (FIG. 1) in cross section (not to scale), according to one embodiment of the present invention. In this embodiment, fiber 13 includes a core 20 surrounded by a cladding 21. Typically, a ferrule 22 surrounds cladding 21 as well. Cladding 21 is typically formed from silica with a lower refractive index than that of core 20. This configuration allows light to propagate through core 21 with essentially total internal reflection. Fiber 13 can be a single mode or multimode fiber.

In this embodiment, core 21 has a diameter of about 60 μm. Including core 20 and cladding 21, fiber 13 has a diameter of about 125 μm. In one embodiment, fiber 13 is implemented using a multimode fiber available from Wave Optics, Inc., Mountain View, Calif. Of course, other embodiments can use other commercially available optical fibers that are suitable for the intended application.

In one embodiment, the plane containing the surface of angled tip 14 and the longitudinal axis of fiber 13 form an angle of about forty-five degrees (also referred to herein as the angle of angle tip 14). In this embodiment, standard angle-polish techniques are used to form angled tip 14 on one end of fiber 13. In other embodiments, the angle of angled tip 14 can range from greater than zero but less than ninety degrees. However, angles ranging from four to forty-five degrees are generally preferred.

FIG. 2A illustrates another embodiment (not to scale) in which fiber 13 includes a coating 23 formed on the surface of angled tip 14. Coating 23 is a partially reflective coating used to increase reflection from cladding 21. Such optical coatings are commercially available. The increased reflection from cladding 21 tends to improve the performance of tracker 15 in correcting misalignments. Thus, this configuration can advantageously allow increased reflection by the cladding when there is misalignment, which can help improve the performance of tracker 15 in correcting the misalignment.

FIG. 2B illustrates an alternative coated fiber embodiment (not to scale) in which a coating 24 is formed from a metal, such as Aluminum. Coating 24 would cover the entire surface of angled tip 14 as well as the ferrule. The portion of the metal coating covering the core would then be removed as shown in FIG. 2B. This embodiment allows reflected optical signal 18B (FIG. 1) to have more power when there is misalignment between optical signal 18 (FIG. 1) and the optical receiver (not shown).

Figure 3:
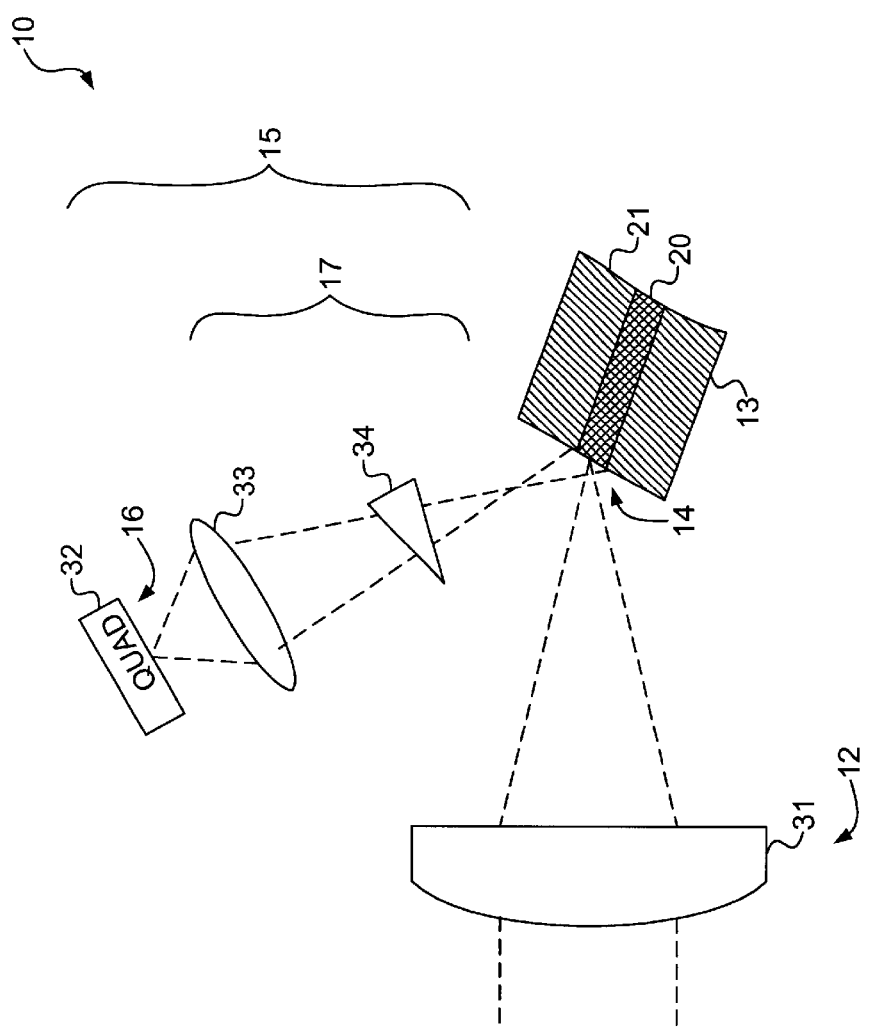
FIG. 3 is a diagram illustrating an implementation of the tracking system of FIG. 1, according to one embodiment of the present invention.

FIG. 3 illustrates an implementation (not to scale) of optical tracking system 10 (FIG. 1) for use in a laser communication system, according to one embodiment of the present invention. In this embodiment, focus unit 12 is implemented using a focusing lens 31. As previously described for focus unit 12 in conjunction with FIG. 1, focusing lens 31 focuses the laser beam implementing optical signal 18 (FIG. 1) onto angled tip 14 of fiber 13. Focusing lens 31 is designed for the anticipated diameter of optical signal 18 when received and for the intended focal length. In addition, in some embodiments, the position of focusing lens 31 can be adjusted to optimize the focusing process (also referred to as active focusing) and not disturb the imaging between angled tip 14 and optical detector 16.

In one embodiment, optical detector 16 is implemented using multi-cell detector. In this particular embodiment, optical detector 16 is implemented using a quad cell detector 32 (i.e., an optical detector device four cells or regions). For example, in one embodiment, optical detector 20 is implemented using a J16 series Germanium quad cell, available from Judson Technologies, LLC, Montgomeryville, Pa. Of course, other embodiments may use different optical detectors that are suitable for the intended application. Quad cell detector 32 is positioned so that when optical signal 18 (FIG. 1) and the optical receiver (not shown) are properly aligned, reflected optical signal 18B (FIG. 1) equally illuminates all four cells of quad cell detector 32. Thus, when the cells of quad cell detector 32 are not equally illuminated, there is misalignment between optical signal 18 and the optical receiver. In this way, quad cell detector 32 detects misalignment between optical signal 18 and the optical receiver. Although a quadrant detector system is described for this embodiment of optical detector 16, different detector systems can be used in other embodiments. For example, optical detector 16 can be implemented using a lateral effect device such as, for example, a SC-10D device available from UDT Sensors, Inc., Hawthorne, Calif.

Further, in this embodiment, focus unit 17 is implemented with a lens 33 and an optical wedge 34. Optical wedge 34 operates to steer the optical signal (i.e., reflected optical signal 18B shown in FIG. 1) reflected from angled tip 14 of fiber 13 to lens 33. Wedge 34 is used in embodiments, for example, in which the position of angled tip 14 of fiber 13 can be moved in an axial direction. As previously described for focus unit 17 in conjunction with FIG. 1, lens 33 and optical wedge 34 operate together to focus reflected optical signal 18B (FIG. 1) onto quad detector 32. In other embodiments, optical wedge 34 may be omitted. These other embodiments are advantageously used in systems without active focusing.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. A system for use in an optical communication system, the system comprising:
   a first focus unit having an axis and a focal point on the axis;
   a fiber operatively coupled to the first focus unit, the fiber having an angled tip positioned to intersect the axis of the first focus unit; and
   a tracker operatively coupled to the fiber, the tracker being positioned to receive an optical signal reflected from the angled tip of the fiber.

2. The system of claim 1, wherein the first focus unit comprises a first lens.

3. The system of claim 1, wherein the first focus unit comprises a reflective optical imager.

4. The system of claim 1, wherein the first focus unit comprises a holographic optical element.

5. The system of claim 1, further comprising a coating covering the angled tip of the fiber.

6. The system of claim 5, wherein the coating comprises a metal, the coating covering a cladding of the fiber and leaving uncovered a core of the fiber.

7. The system of claim 5, wherein the coating is a partially reflective coating, the coating covering a core and a cladding of the fiber.

8. The system of claim 1, wherein the angle of the angled tip ranges from four to forty-five degrees relative to a longitudinal axis of the fiber.

9. The system of claim 1, wherein the tracker includes:
   a second focus unit positioned to focus the optical signal reflected from the angled tip of the fiber; and
   an optical detector operative coupled to the second focus unit.

10. The system of claim 9, wherein the second focus unit comprises:
    an optical wedge positioned to receive the optical signal reflected from the angled tip of the fiber; and
    a second lens operatively coupled to the optical wedge and configured to focus the optical signal received by the optical wedge onto the optical detector.

11. The system of claim 9 wherein the optical detector comprises a quad cell detector.

12. The system of claim 9 wherein the optical detector comprises a lateral effect device.

13. A system for use in an optical communication system, the system comprising:
    first focus means for focusing an optical signal received from an external source, the first focus means having an axis and a focal point on the axis;
    fiber means for receiving a focused optical signal from the first focus means, the fiber means having an angled tip positioned to intersect the axis of the first focus means; and
    tracker means for receiving and processing a reflected portion of the focused optical signal received by the angled tip of the fiber means.

14. The system of claim 13, further comprising a coating formed on the angled tip of the fiber means.

15. The system of claim 14, wherein the coating comprises a metal, the coating covering a cladding of the fiber means and leaving uncovered a core of the fiber means.

16. The system of claim 14, wherein the coating is a partially reflective coating, the coating covering a core and a cladding of the fiber means.

17. The system of claim 13, wherein the first focus means comprises a first lens.

18. The system of claim 13, wherein the first focus means comprises a reflective optical imager.

19. The system of claim 13, wherein the first focus means comprises a holographic optical element.

20. The system of claim 13, wherein the angle of the angled tip ranges from four to forty-five degrees relative to a longitudinal axis of the fiber means.

21. The system of claim 13, wherein the tracker means includes:
    second focus means for focusing the optical signal reflected from the angled tip of the fiber means; and
    optical detector means for processing the optical signal focused by the second focus means.

22. The system of claim 19 wherein the second focus means comprises:
    an optical wedge positioned to receive the optical signal reflected from the angled tip of the fiber means to form a steered optical signal; and
    a second lens operatively coupled to the optical wedge and configured to focus the steered optical signal from the optical wedge onto the optical detector means.

23. The system of claim 19 wherein the optical detector means comprises a quad cell detector.

24. The system of claim 19 wherein the optical detector means comprises a lateral effect device.

25. A method for use in an optical communication system having an optical transmitter and an optical receiver, the method comprising:
    focusing an optical signal received from the optical transmitter on a focal point located on an axis of propagation of the optical signal;
    receiving the focused optical signal using an optical fiber having an angled tip positioned to intersect the axis of propagation; and
    detecting misalignment between an optical receiver and the optical signal from the optical transmitter using a portion of the focused optical signal reflected by the angled tip of the fiber to a tracker.

26. The method of claim 22, wherein the angle of the angled tip ranges from four to forty-five degrees relative to a longitudinal axis of the fiber.

27. The method of claim 22, wherein detecting misalignment comprises:
    focusing the portion of the focused optical signal reflected from the angled tip of the fiber to form a focused reflected optical signal; and
    processing the focused reflected optical signal using an optical detector.

28. The method of claim 22 wherein the fiber propagates an unreflected portion of the focused optical signal to a communications detector.

* * * * *